United States Patent
Chen

(10) Patent No.: US 8,026,952 B2
(45) Date of Patent: Sep. 27, 2011

(54) IMAGE CAPTURING DEVICE WITH REDUCED-SIZED SUB-IMAGE COLLECTION AND AN IMAGE PROCESSING METHOD THEREOF

(75) Inventor: Yung-Wei Chen, Taipei (TW)

(73) Assignee: Silicon Motion, Inc., Jhubei (TW)

( * ) Notice: Subject to any disclaimer, the term of this patent is extended or adjusted under 35 U.S.C. 154(b) by 350 days.

(21) Appl. No.: 12/400,860

(22) Filed: Mar. 10, 2009

(65) Prior Publication Data

US 2010/0091132 A1    Apr. 15, 2010

(30) Foreign Application Priority Data

Oct. 9, 2008    (TW) ............................... 97138937 A

(51) Int. Cl.
*H04N 5/228* (2006.01)

(52) U.S. Cl. .................................... 348/222.1; 348/453

(58) Field of Classification Search .................. 348/453, 348/223.1, 222.1, 272–280; 345/604
See application file for complete search history.

(56) References Cited

U.S. PATENT DOCUMENTS

| | | | |
|---|---|---|---|
| 5,926,208 A * | 7/1999 | Noonen et al. ............. | 348/14.13 |
| 2005/0190270 A1* | 9/2005 | Park ........................... | 348/222.1 |
| 2007/0222891 A1* | 9/2007 | Hsu ............................... | 348/453 |
| 2009/0052772 A1* | 2/2009 | Speirs et al. ................... | 382/166 |

* cited by examiner

*Primary Examiner* — Nelson D. Hernández
(74) *Attorney, Agent, or Firm* — Wang Law Firm, Inc.; Li K. Wang

(57) ABSTRACT

An image capturing device and the image preprocessing method thereof. The image preprocessing technique receives digital image consisting of luma data and chrominance data, integrates the chrominance data of adjacent rows to generate integrated chrominance data, buffers the luma data and the integrated chrominance data in a group of line buffers, and generates pre-processed chrominance data by making adjacent rows share the same integrated chrominance data. The luma data from the line buffer group form an image with the pre-processed chrominance. The image may be displayed on a display.

10 Claims, 2 Drawing Sheets

FIG. 1

IMAGE CAPTURING DEVICE WITH REDUCED-SIZED SUB-IMAGE COLLECTION AND AN IMAGE PROCESSING METHOD THEREOF

CROSS REFERENCE TO RELATED APPLICATIONS

This Application claims priority of Taiwan Patent Application No. 97138937, filed on Oct. 9, 2008, the entirety of which is incorporated by reference herein.

BACKGROUND OF THE INVENTION

1. Field of the Invention

The present invention relates to image capturing devices and image preprocessing methods thereof, and particularly relates to YUV format image preprocessing methods and devices.

2. Description of the Related Art

YUV encoding is a common image encoding technique in digital image processing. The YUV model defines a color space in terms of one luma component (Y) and two chrominance components (U and V). The chrominance component U, as known as $C_b$, shows blue-chrominance difference. The chrominance component V, as known as $C_r$, shows red-chrominance difference. The following shows an example of RGB-YUV transformation:

$$Y=0.299*R+0.587*G+0.114*B,$$

$$U=0.436*(B-Y)/(1-0.114), \text{ and}$$

$$V=0.615*(R-Y)/(1-0.299).$$

R represents data for red color. G represents data for green color. B represents data for blue color.

Because human vision is more sensitive to variations of the luma component (Y) and less sensitive to variations of the chrominance components (U and V), chroma sub-sampling is used in YUV encoding. In chroma sub-sampling, the resolution of chroma information (U and V) is lower than that of luma information (Y). One chroma sub-sampling technique is 4:2:2 chroma sub-sampling.

FIG. 1 depicts a frame of data 100, wherein the encoding technique is 4:2:2 chroma sub-sampling. As shown, every pixel is sampled for a luma component Y, and every two pixels share a chrominance component U and a chrominance component V. For example, pixel 102, in row 0 and column 0, provides a luma component $Y_{00}$ and a blue-chrominance difference $U_{00}$ but not a red-chrominance difference (V), and pixel 104 in row 0 and column 1 provides a luma component $Y_{01}$ and a red-chrominance difference $V_{01}$ but not a blue-chrominance difference (U). Pixels 102 and 104 share the blue-chrominance difference $U_{00}$ and red-chrominance difference $V_{01}$.

A digital image may be compressed to data stream. Before being compressed, the image is typically divided into a plurality of sub-images to be sequentially compressed. To collect data for one sub-image, conventional techniques may use line buffers.

The line buffers, furthermore, may be used in other applications. For example, the digital image may be buffered by the line buffers before being displayed.

It is an important issue for a person skilled in the art to reduce the number of the line buffers.

BRIEF SUMMARY OF THE INVENTION

A detailed description is given in the following embodiments with reference to the accompanying drawings.

The invention discloses image capturing devices and image preprocessing methods thereof. The image capturing device comprises a light sensing unit, a digital image generating unit, a first image preprocessing unit, a plurality of line buffers, and a second image preprocessing unit. The light sensing unit and the digital image generating unit sense the image and generate digital image. The digital image consists of luma data and chrominance data. The luma data are buffered in the line buffers. The chrominance data are sent to the first image preprocessing unit. The first image preprocessing unit integrates the chrominance data of adjacent rows to reduce chrominance data volume. The integrated chrominance data are buffered by the line buffers. The second preprocessing unit receives the integrated chrominance data from the line buffers and generates pre-processed chrominance data to make adjacent rows to share the same integrated chrominance data. The pre-processed chrominance data from the second image preprocessing unit and the luma data from the line buffers form an image to be displayed in a display.

The image preprocessing process disclosed in the invention is not limited to being performed prior to the image displaying process. In other embodiments, the image preprocessing process may be performed prior to other image processing processes, such as image compression, requiring sub-image data collecting. An exemplary embodiment of the image preprocessing method comprises: receiving image data consisting of luma data and chrominance data; integrating the chrominance data of adjacent rows to reduce chrominance data volume; buffering the luma data and the integrated chrominance data in line buffers; receiving the integrated chrominance data from the line buffers and generating pre-processed chrominance data by assigning each row of integrated chrominance data to the corresponding adjacent rows. The luma data, from the line buffers, and the pre-processed chrominance data form an image to be displayed, or processed later.

BRIEF DESCRIPTION OF THE DRAWINGS

The present invention can be more fully understood by reading the subsequent detailed description and examples with references made to the accompanying drawings, wherein:

FIG. 1 depicts a frame of data, wherein the encoding technique is 4:2:2 chroma sub-sampling.

DETAILED DESCRIPTION OF THE INVENTION

Figure 2:
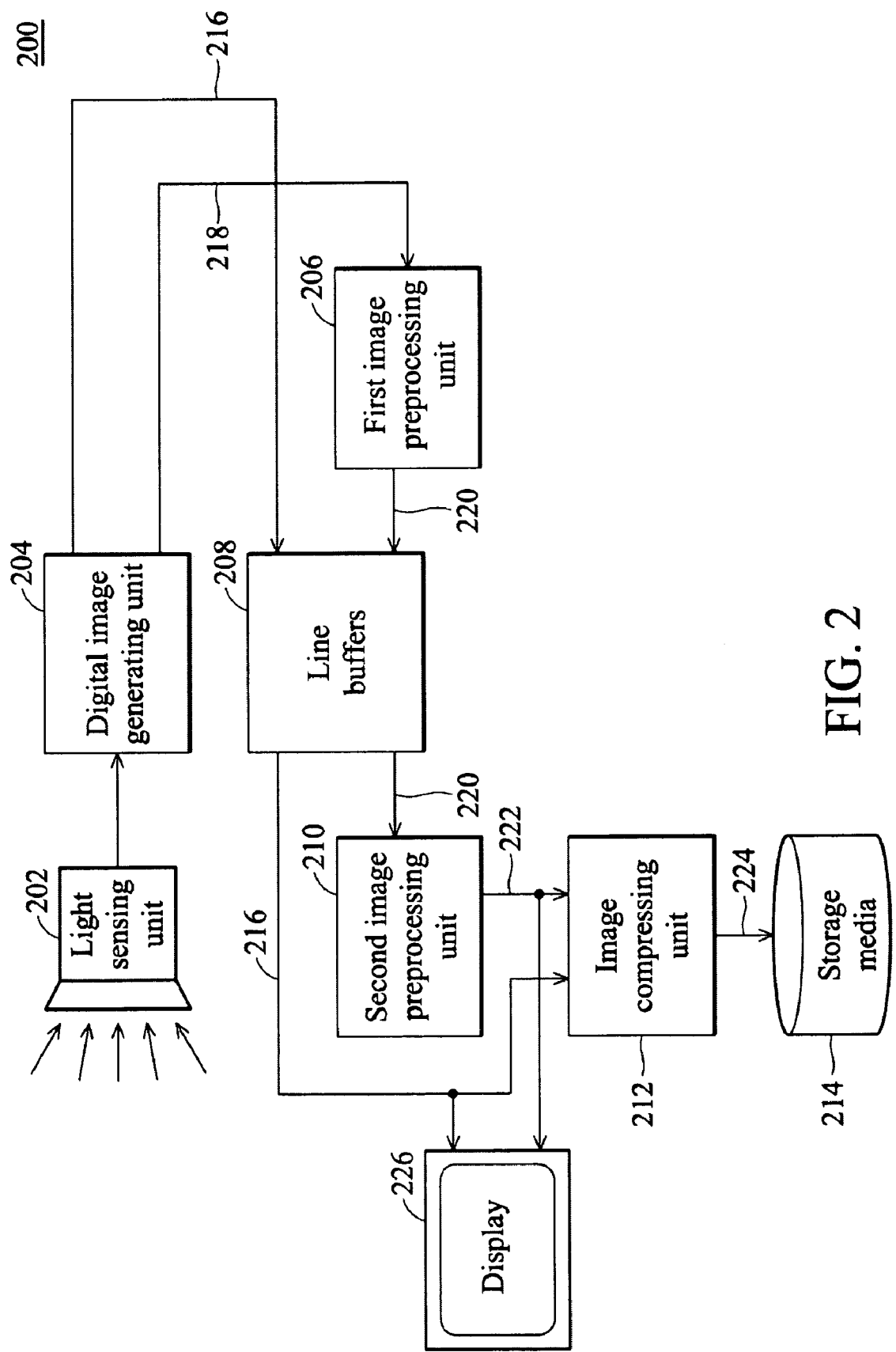
FIG. 2 illustrates an embodiment of the image capturing devices of the invention.

The following description recites exemplary embodiments of the invention. This description is made for the purpose of illustrating the general principles of the invention and should not be taken in a limiting sense. The scope of the invention is test determined by reference to the appended claims.

FIG. 2 illustrates an embodiment of the image capturing devices of the invention. The image capturing device 200 may be a web-cam, a digital camera and so on. The image capturing device 200 comprises a light sensing unit 202, a digital image generating unit 204, a first image preprocessing unit 206, a group of line buffers 208 and a second image preprocessing unit 210.

The light sensing unit 202 senses light to capture images, and may be realized by charge-coupled devices (CCDs) or CMOSs. An analog image provided by the light sensing unit 202 is amplified and transformed to a digital image by the digital image generating unit 204. The image encoding technique of this embodiment is of a YUV format, which defines a color in terms of one luma (Y) and two chrominance components (U and V). Signal line 216 represents luma data (Y) and signal line 218 includes chrominance data (U and V). As shown, the luma data 216 is buffered by the group of line buffers 208. The chrominance data 218, however, are transformed to integrated chrominance data 220 by the first image preprocessing unit 206 before being buffered by the line buffers 208. The first preprocessing unit 206 generates the integrated chrominance data 220 by integrating the chrominance data of adjacent rows of the digital image. Thus, the volume of the integrated chrominance data 220 is much smaller than the volume of the chrominance data 218.

The second image preprocessing unit 210 is coupled after the line buffers 208 to receive the integrated chrominance data 220 from the line buffers 208. By assigning each of the integrated chrominance data to the corresponding adjacent rows, the second image preprocessing unit 210 generates pre-processed chrominance data 222. The luma data from the line buffers 208 and the pre-processed chrominance data 222 from the second preprocessing unit 210 can form an image to be displayed on a display 226.

In another case, the luma data from the line buffers 208 and the pre-processed chrominance data 222 from the second preprocessing unit 210 can be compressed to a smaller size by an image compressing unit 212. The image compressing unit 212 is coupled to the line buffers 208 and the second image preprocessing unit 210 to receive the luma data and the pre-processed chrominance data 222. The image compressor 212 performs image compression on the received data. The compressed luma and pre-processed chrominance data maybe stored in a storage media 214.

Figure 1:
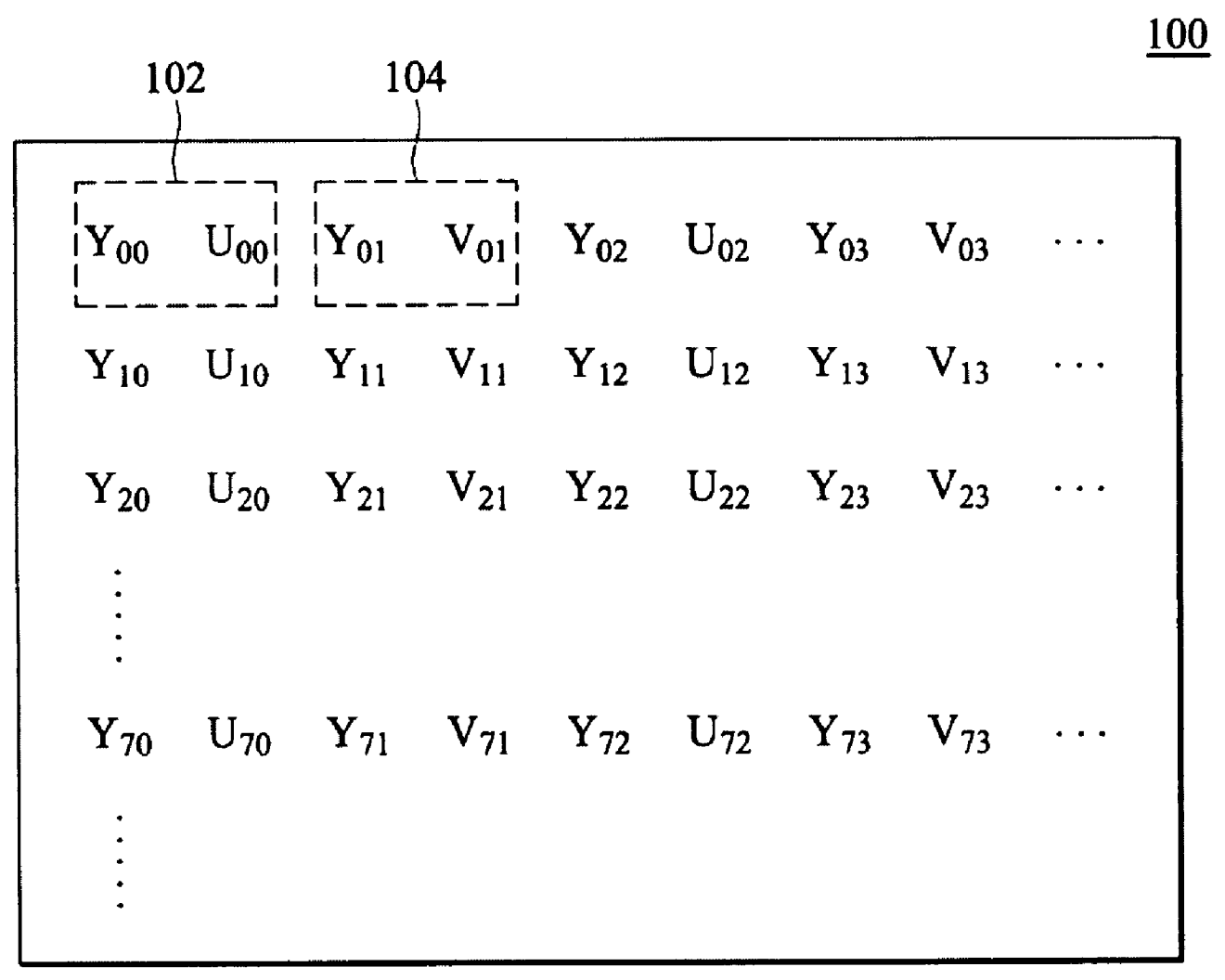

The YUV encoding technique of the digital image (including data 216 and 218) may be 4:2:2 chrominance encoding. The chrominance data 218 includes data for blue-chrominance difference (U, as known as $C_b$) and data for red-chrominance difference (V, as known as $C_r$). Based on the frame data shown in FIG. 1, the first preprocessing unit 206 may perform the following calculations:

$$M_{y,\,2x} = (U_{2y,\,2x} + U_{2y+1,\,2x})/2;\text{ and}$$

$$N_{y,\,2x+1} = (V_{2y,\,2x+1} + V_{2y+1,\,2x+1})/2 \qquad \text{(Formulas 1)}.$$

y and x are variables. $M_{y,\,2x}$ and $N_{y,\,2x+1}$ form the integrated chrominance data. $U_{2y,\,2x}$ represent blue-chrominance difference data at the $2y^{th}$ row and the $2x^{th}$ column. $U_{2y+1,\,2x}$ represent blue-chrominance difference data at the $(2y+1)^{th}$ row and the $2x^{th}$ column. $V_{2y,\,2x+1}$ represent red-chrominance difference data at the $2y^{th}$ row and the $(2x+1)^{th}$ column. $V_{2y+1,\,2x+1}$ represent red-chrominance difference data at the $(2y+1)^{th}$ row and the $(2x+1)^{th}$ column.

This paragraph recites examples of integrating chrominance data, wherein the chrominance data of row 0 and row 1 are integrated. According to Formulas 1: blue-chrominance difference, $U_{00}$ and $U_{01}$, of rows 0 and 1 are integrated to generate integrated chrominance datum $M_{00}$, wherein $M_{00} = (U_{00}+U_{10})/2$; red-chrominance difference, $V_{01}$ and $V_{11}$, of rows 0 and 1 are integrated to generate integrated chrominance datum $N_{01}$, wherein $N_{01}=(V_{01}+V_{11})/2$; blue-chrominance difference, $U_{02}$ and $U_{12}$, of rows 0 and 1 are integrated to generate integrated chrominance datum $M_{02}$, wherein $M_{02}=(U_{02}+U_{12})/2$; and red-chrominance difference, $V_{03}$ and $V_{13}$, of rows 0 and 1 are integrated to generate integrated chrominance datum $N_{03}$, wherein $N_{03}=(V_{03}+V_{13})/2$. Similarly, the remaining integration of chrominance data for rows 0 and 1 are performed.

The volume of the line buffers 208 may be designed according to the size of one sub-image. The following recites an example wherein one sub-image includes 8×16 pixels. For a sub-image within rows 0-7 and columns 0-15, the data buffered in the line buffers 208 includes:

$Y_{00}, Y_{01}, Y_{02}, Y_{03} \ldots Y_{0,15}$;
$Y_{10}, Y_{11}, Y_{12}, Y_{13} \ldots Y_{1,15}$;
$\ldots$
$Y_{70}, Y_{71}, Y_{72}, Y_{73} \ldots Y_{7,15}$;
$M_{00}, N_{01}, M_{02}, N_{03} \ldots N_{0,15}$;
$M_{10}, N_{11}, M_{12}, N_{13} \ldots N_{1,15}$;
$M_{20}, N_{21}, M_{22}, N_{23} \ldots N_{2,15}$; and
$M_{30}, N_{31}, M_{32}, N_{33} \ldots N_{3,15}$.

In conventional image capturing devices without the first and second pre-processing units 206 and 210 of the invention, the buffered data for the same sub-image includes:

$Y_{00}, Y_{01}, Y_{02}, Y_{03} \ldots Y_{0,15}$;
$Y_{10}, Y_{11}, Y_{12}, Y_{13} \ldots Y_{1,15}$;
$\ldots$
$Y_{70}, Y_{71}, Y_{72}, Y_{73} \ldots Y_{7,15}$;
$U_{00}, V_{01}, U_{02}, V_{03} \ldots V_{0,15}$;
$U_{10}, V_{11}, U_{12}, V_{13} \ldots V_{1,15}$;
$\ldots$
$U_{70}, V_{71}, U_{72}, V_{73} \ldots V_{7,15}$.

As shown, the invention dramatically reduces the buffered data by 25%. Compared with conventional techniques, the invention reduces the required size and cost of the line buffers.

The second preprocessing unit 210 may perform the following calculations to generate the pre-processed chrominance data:

$$U'_{2y,\,2x} = U'_{2y+1,\,2x} = M_{y,\,2x};\text{ and}$$

$$V'_{2y,\,2x+1} = V'_{2y+1,\,2x+1} = N_{y,\,2x+1} \qquad \text{(Formulas 2)}.$$

Data $U'_{2y,\,2x}$, $U'_{2y+1,\,2x}$, $V'_{2y,\,2x+1}$ and $V'_{2y+1,\,2x+1}$ form the pre-processed chrominance data 222.

This paragraph recites how the pre-processed chrominance data for rows 0 and 1 are generated. Based on the integrated chrominance data $M_{00}$, pre-processed chrominance datum for row 0, column 0 ($U'_{00}$) and pre-processed chrominance datum for row 1, column 0 ($U'_{10}$) are generated, wherein $U'_{00}=U'_{10}=M_{00}$. Based on the integrated chrominance data $N_{01}$, pre-processed chrominance datum for row 0, column 1 ($V'_{01}$) and pre-processed chrominance datum for row 1, column 1 ($V'_{11}$) are generated, wherein $V'_{01}=V'_{11}=N_{01}$. Based on the integrated chrominance data $M_{02}$, pre-processed chrominance datum for row 0, column 2 ($U'_{02}$) and pre-processed chrominance datum for row 1, column 2 ($U'_{12}$) are generated, wherein $U'_{02}=U'_{12}=M_{02}$. Based on the integrated chrominance data $N_{03}$, pre-processed chrominance datum for row 0, column 3 ($V'_{03}$) and pre-processed chrominance datum for row 1, column 3 ($V'_{13}$) are generated, wherein $V'_{03}=V'_{13}=N_{03}$. Similarly, the remaining pre-processed chrominance data for rows 0 and 1 are generated.

The pre-processed chrominance data include chrominance information for the whole frame. The pre-processed chrominance data and luma data form the digital image to be displayed or to be compressed.

The image preprocessing method of the invention is not limited to be performed prior to the image displaying process or image compression process. It can be performed prior to any image processing that requires sub-image collecting. The following details the steps of the image pre-processing method. First, a digital image is received, wherein the digital image is encoded by 4:2:2 chroma sub-sampling and includes luma data Y and chrominance data U and V. Then, Formulas 1 are performed to integrate the chrominance data of adjacent rows. The luma data Y and the integrated chrominance data M and N are buffered by a group of line buffers. Based on the integrated chrominance data from the line buffers, Formulas 2 are performed to generate pre-processed chrominance data U' and V'. The luma data Y from the line buffers and the pre-processed data U' and V' form an image to be displayed or compressed. The image preprocessing techniques of the invention reduces the size and the cost of the image capturing device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing device, comprising:
   a light sensing unit, sensing light to generate an analog image;
   a digital image generating unit, receiving the analog image to generate a digital image consisting of luma data and chrominance data;
   a first image preprocessing unit, integrating the chrominance data of adjacent rows to generate integrated chrominance data having reduced chrominance data volume;
   a plurality of line buffers, buffering the luma data and the integrated chrominance data for sub-image collection; and
   a second image preprocessing unit, receiving the integrated chrominance data from the line buffers and expanding the integrated chrominance data to generate pre-processed chrominance data, wherein each row of the integrated chrominance data are copied to the corresponding adjacent rows of the pre-processed chrominance data,
   wherein the luma data from the line buffers and the pre-processed chrominance data generated by the second image preprocessing unit are applied in displaying an image on a display.

2. The image capturing device as claimed in claim 1, further comprising an image compressing unit coupled to the line buffers for the luma data and coupled to the second image preprocessing unit for the pre-processed chrominance data, wherein the image compressing unit performs an image compression on the luma data and the pre-processed chrominance data.

3. The image capturing device as claimed in claim 1, wherein the digital image is encoded by 4:2:2 chroma sub-sampling, and the chrominance data include data for blue-chrominance difference and red-chrominance difference.

4. The image capturing device as claimed in claim 3, wherein the first image preprocessing unit performs calculations:

$$M_{y,\,2x}=(U_{2y,\,2x}+U_{2y+1,\,2x})/2;\ \text{and}$$

$$N_{y,\,2x+1}=(V_{2y,\,2x+1}+V_{2y+1,\,2x+1})/2,$$

where
y and x are variables,
$M_{y,\,2x}$ and $N_{y,\,2x+1}$ form the integrated chrominance data,
$U_{2y,\,2x}$ represent blue-chrominance difference data at the $2y^{th}$ row and the $2x^{th}$ column,
$U_{2y+1,\,2x}$ represent blue-chrominance difference data at the $(2y+1)^{th}$ row and the $2x^{th}$ column,
$V_{2y,\,2x+1}$ represent red-chrominance difference data at the $2y^{th}$ row and the $(2x+1)^{th}$ column, and
$V_{2y+1,\,2x+1}$ represent red-chrominance difference data at the $(2y+1)^{th}$ row and the $(2x+1)^{th}$ column.

5. The image capturing device as claimed in claim 4, wherein the second image preprocessing unit performs calculations:

$$U'_{2y,\,2x}=U'_{2y+1,\,2x}=M_{y,\,2x};\ \text{and}$$

$$V'_{2y,\,2x+1}=V'_{2y+1,\,2x+1}=N_{y,\,2x+1},$$

where
$U'_{2y,\,2x}$, $U'_{2y+1,\,2x}$, $V'_{2y,\,2x+1}$ and $V'_{2y+1,\,2x+1}$ form the pre-processed chrominance data.

6. An image preprocessing method within an image capturing device, comprising:
   receiving a digital image consisting of luma data and chrominance data;
   integrating the chrominance data of adjacent rows to generate integrated chrominance data having reduced chrominance data volume;
   using line buffers to buffer the luma data and the integrated chrominance data for sub-image collection;
   receiving the integrated chrominance data from the line buffers and expanding the integrated chrominance data to generate pre-processed chrominance data, wherein each row of the integrated chrominance data are copied to the corresponding adjacent rows of the pre-processed chrominance data,
   wherein the luma data from the line buffers and the pre-processed chrominance data are applied in displaying an image on a display.

7. The image preprocessing method as claimed in claim 6, wherein the digital image is encoded by 4:2:2 chroma sub-sampling, and the chrominance data include data for blue-chrominance difference and red-chrominance difference.

8. The image preprocessing method as claimed in claim 7, wherein the step of integrating the chrominance data comprises the following calculations:

$$M_{y,\,2x}=(U_{2y,\,2x}+U_{2y+1,\,2x})/2;\ \text{and}$$

$$N_{y,\,2x+1}=(V_{2y,\,2x+1}+V_{2y+1,\,2x+1})/2,$$

where
y and x are variables,
$M_{y,\,2x}$ and $N_{y,\,2x+1}$ form the integrated chrominance data,
$U_{2y,\,2x}$ represent blue-chrominance difference data at the $2y^{th}$ row and the $2x^{th}$ column,
$U_{2y+1,\,2x}$ represent blue-chrominance difference data at the $(2y+1)^{th}$ row and the $2x^{th}$ column, $V_{2y, 2x+1}$ represent red-chrominance difference data at the $2y^{th}$ row and the $(2x+1)^{th}$ column, and $V_{2y+1, 2x+1}$ represent red-chrominance difference data at the $(2y+1)^{th}$ row and the $(2x+1)^{th}$ column.

9. The image preprocessing method as claimed in claim 8, wherein the step of generating the pre-processed chrominance data comprises the following calculations:

$$U'_{2y, 2x} = U'_{2y+1, 2x} = M_{y, 2x}; \text{ and}$$

$$V'_{2y, 2x+1} = V'_{2y+1, 2x+1} = N_{y, 2x+1},$$

where $U'_{2y, 2x}$, $U'_{2y+1, 2x}$, $V'_{2y, 2x+1}$ and $V'_{2y+1, 2x+1}$ form the pre-processed chrominance data.

10. The image preprocessing method as claimed in claim 6, further comprising performing image compression on the luma data from the line buffers and the pre-processed chrominance data and storing the compressed luma and pre-processed chrominance data in a storage media.

* * * * *